United States Patent [19]

Stoica

[11] Patent Number: 5,023,892

[45] Date of Patent: Jun. 11, 1991

[54] SYSTEM FOR DETECTING AND CORRECTING SIGNAL DISTORTION

[75] Inventor: Adrian Stoica, Silver Spring, Md.

[73] Assignee: Printer Systems Corporation, Gaithersburg, Md.

[21] Appl. No.: 505,597

[22] Filed: Apr. 6, 1990

[51] Int. Cl.$^5$ ............................................. H04L 25/08
[52] U.S. Cl. ...................................... 375/118; 375/12; 328/162
[58] Field of Search .................. 375/11, 12, 106, 110, 375/113, 118, 99; 370/108, 105.3; 328/155, 165, 162

[56]  References Cited

U.S. PATENT DOCUMENTS

| | | | |
|---|---|---|---|
| 3,480,910 | 11/1969 | Brenza et al. | 328/151 |
| 3,688,260 | 8/1972 | Jensen et al. | 358/168 |
| 3,909,724 | 9/1975 | Spath et al. | 375/114 |
| 4,006,454 | 2/1977 | Beseke et al. | 328/28 |
| 4,010,323 | 3/1977 | Peck | 375/118 |
| 4,012,598 | 3/1977 | Wiley | 375/118 |
| 4,107,651 | 8/1978 | Martin | 324/184 |
| 4,293,949 | 10/1981 | Philippides | 371/6 |
| 4,353,032 | 8/1982 | Taylor | 328/165 |
| 4,456,893 | 6/1984 | Otani | 375/12 |
| 4,456,992 | 6/1984 | Schaub | 371/6 |
| 4,495,621 | 1/1985 | Nakagomi | 371/6 |
| 4,513,427 | 4/1985 | Borriello et al. | 370/108 |
| 4,556,869 | 12/1985 | Thomson | 375/55 |
| 4,637,036 | 1/1987 | Kobari | 375/76 |
| 4,644,569 | 2/1987 | Brown et al. | 375/118 |
| 4,653,075 | 3/1987 | Wisniewski | 375/110 |
| 4,686,676 | 8/1987 | McPherson | 371/36 |
| 4,841,551 | 6/1987 | Auaneas | 375/110 |
| 4,931,986 | 6/1990 | Daniel et al. | 375/118 |

Primary Examiner—Douglas W. Olms
Assistant Examiner—Stephen Chin
Attorney, Agent, or Firm—James J. Brown

[57]  ABSTRACT

A system is provided for detecting and correcting signal distortion in a received digital signal which comprises a series of pulses whose parameters are defined by transitions in the amplitude of the signal pulses. The device of the invention includes components which sample the signal pulse values a predetermined number of times, a variable length shift register having a variable number of memory cells for selectively storing and retrieving the sampled signal values, a variable frequency clock and provision of synchronizing the reference clock with the sampled signal pulses.

3 Claims, 10 Drawing Sheets

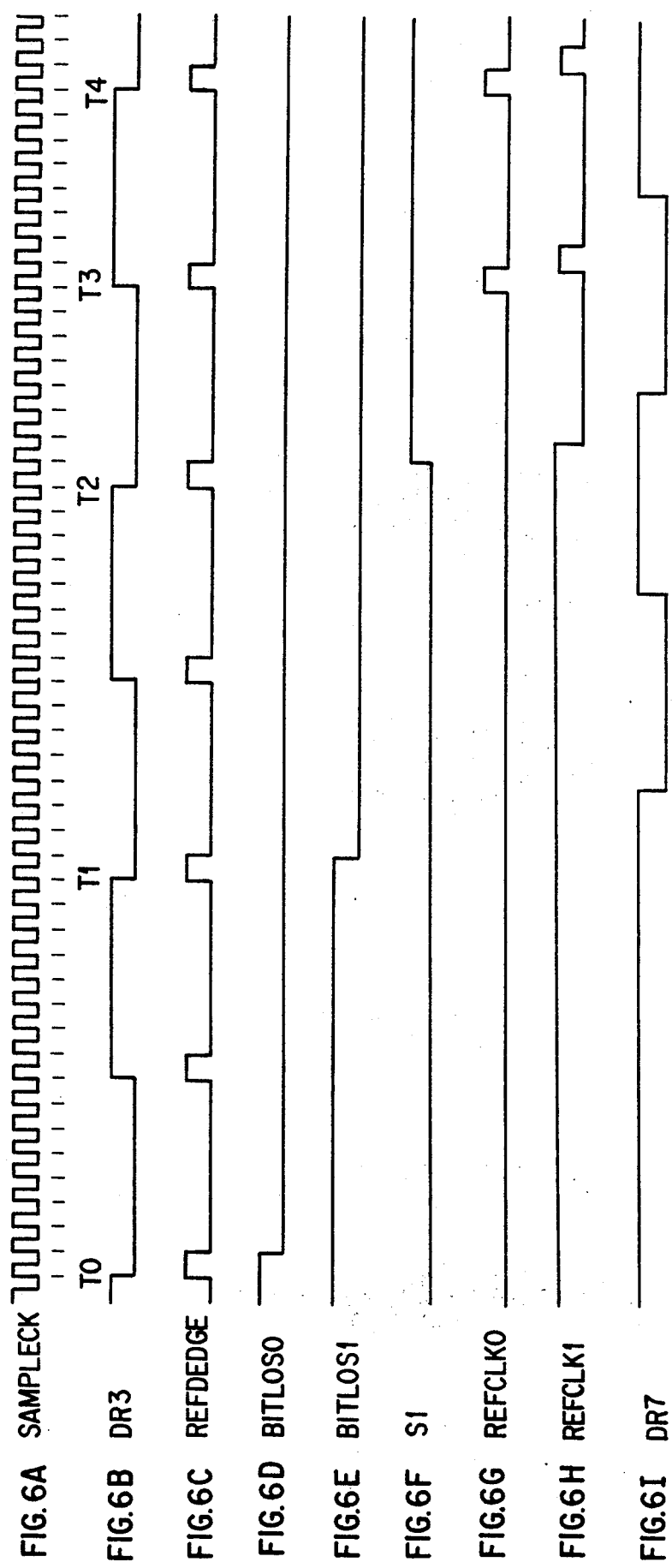

SAMPLECK

DR3

REFCLK0

BITLOS0

BITLOS1

S1

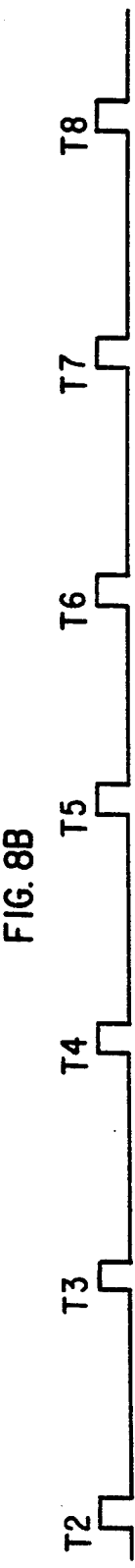
FIG. 8A SAMPLECK
FIG. 8B DR3
FIG. 8C REFCLK0
FIG. 8D PREVP
FIG. 8E REFCLK1
FIG. 8F REFCLK2

FIG. 9A1  FIG. 9A2  FIG. 9A3  FIG. 9A4  FIG. 9B1  FIG. 9B2  FIG. 9B3  FIG. 9B4

SYSTEM FOR DETECTING AND CORRECTING SIGNAL DISTORTION

BACKGROUND OF INVENTION

The present invention is concerned with a device for receiving width modulated digital data pulses and more particularly with detection and correction of signal transitions for data pulses received from a noisy or lengthy capacitive line, or combination of both.

While there are many encoding techniques employed to change an incoming serial binary data stream into a frequency modulated digital signal, frequently this is done by changing binary data into a stream of variable width data pulses where any pulse width is a multiple of a basic value. A pulse is therefore delimited by the change of value only and not by the data value itself. Thus, for any given pulse, data can have either 1 or 0 logical values.

When sending such encoded signal pulses over long transmission lines it is important that "n", the value of the multiple of the basic or minimum value TWm for a pulse width (TWi) be as small as possible. However, it cannot be smaller than 2, since two binary values have to be encoded. Furthermore the correct reception of the encoded signal is not possible without unique synchronization markers. Therefore in most cases "n" has a value not less than 3.

The transmission of encoded data is typically preceded by a synchronization sequence during which a number of constant width data pulses, (usually with TW =TWm) and a unique synchronization marker allow the receiver to currently identify the beginning of the data sequence. Improving signal t o noise ratio at the receiver end of the transmission line has often been achieved through the use of low pass filters that reject high frequency noise that most affects signal reception. To a degree, however, these filters also distort the useful digital signal. On the other hand, long transmission lines that exhibit a capacitive impedance act themselves as low pass filters for the digital signal they carry. The resulting signal waveform at the receiver end is characterized by low amplitude and slow rise and fall times that can be reliable translated to logic levels only by line receivers with hysteresis characteristics. The line and filter capacitive loads, filtered noise, and circuit nonlinearity among other factors, cause an unwanted side effect whereby there is a time difference between expected and actual values of signal pulse widths, commonly known as jitter.

Prior art decoding devices have concentrated on determining the proper width value by measuring TW actual and adjusting it to the closest expected value, TWexpected. The bigger the jitter, the more difficult it is to decode the received digital signal. In general the absolute jitter value has to be less than 0.5 TWi for the received signal to be properly decoded.

It is therefore the object of this invention to provide a method and a device that are capable of predicting positions for signal transitions when expected pulse widths are a multiple of a basic value.

Another object of this invention is the provide a device that, when connected to an incoming signal consisting of digital data pulses is capable of detecting and correcting shifted signal transitions such that the resulting signal can be decoded error free.

A further object of this invention is to provide a device that when connected to a signal of the type described above is capable of correcting pulse width that in certain cases exhibit jitter greater than one half t he width of the pulse.

A still further object of this invention is provide a device which maintains synchronism with a data transmitter even when the transmitter and receiver clocks are out of synchronism.

Another object of this invention is to provide a relatively simply and inexpensive device of the type described above.

BRIEF DESCRIPTION OF THE DRAWINGS

FIG. 6 is a waveform diagram illustrating the transition from S0 to S1.

FIG. 8 is a waveform diagram illustrating the fine clock synchronization according with the invention immediately after the transition from S0 to S1.

FIGS. 9A and 9B are waveform diagrams illustrating the jitter detection and correction process in accordance with the invention.

DETAILED DESCRIPTION OF THE INVENTION

Figure 1:
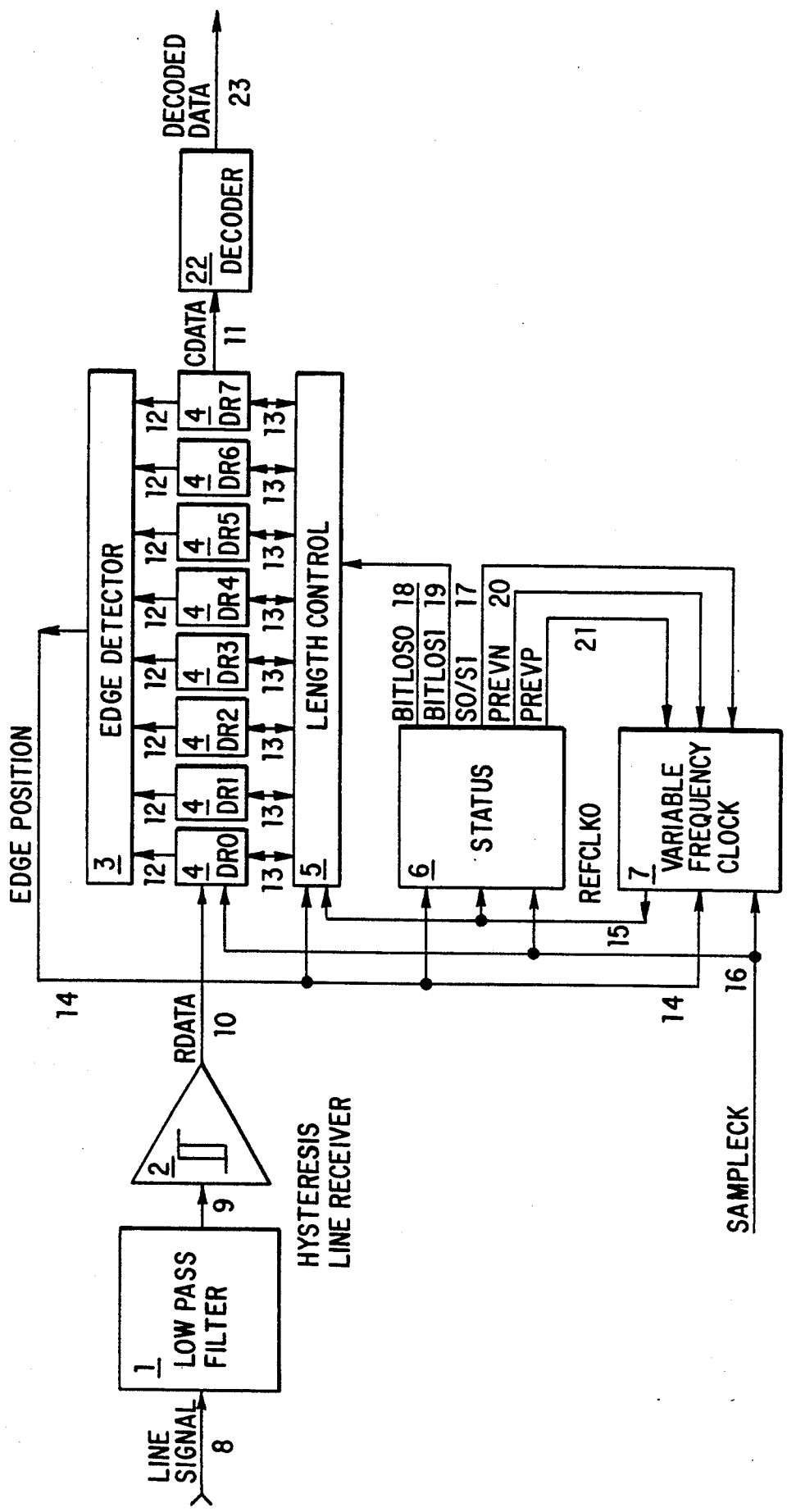
FIG. 1 is a block diagram of a system in accordance with the invention for detecting and correcting shifted data edges in a stream of width modulated data pulses.

The above and other objectives are achieved in accordance with the present invention whereby a device is provided for detecting and correcting signal distortion in a received digital signal comprising a series of pulses whose parameters are defined by transitions in the amplitude of the signal pulses and which essentially includes a provision in sampling the signal pulse values a predetermined number of times, a variable length shift register for selectively storing and retrieving the predetermined number of signal pulse values, a variable frequency reference clock, and a device for synchronizing the reference clock with the sampled signal pulse values.

In order to facilitate a more detailed consideration of the present invention the following abbreviations have been used:

REFCLK—Variable Frequency Reference Clock
TEK—Nominal Period of REFCLK
Ns—integer
REFCLK0—Reference Signal for REFCLK at beginning of each TEK
VLSR—Variable Length Shift Register
REFDEDGE—Data transitions that occur at middle VLSR position
LVLSR—Nominal Length of VLSR
DEDGE—Actual data edge position while REFCLK0=1
SAMPLECK—Sample Clock
RDATA—Received data input
CDATA—Corrected data output Other abbreviations which are used herein in describing the invention will become apparent.

In accordance with the present invention Received encoded digital signals are sampled a predetermined number of times Ns during Twm along with a variable length shift register, from now on referred to as VLSR for storing and delaying sampled data.

Incoming data is synchronized with REFCLK such that while REFCLK0=1 data transitions are likely to occur at a middle VLSR position, called the expected position. Such transitions are called for reference edge, REFDEDGE. More precisely VLSR nominal length LVLSR is an even number

LVLSR=2 R with VLSR bit cells assigned numbers from 0 to 2 R-1. The REFDEDGE is defined true for VLSR bit cells R-1 and R having opposite values while REFCLK0=1.

The actual number of bit cells that each data edge has to pass through is altered according to the invention before exiting VLSR, thus correcting the difference between the actual data edge position while REFLCK0=1, called DEDGE, and REFDEDGE. UP to R-1 bit cells can be added to or subtracted from Lvlsr while REFCLK0=1.

Information is stored regarding the DEDGE - REFDEDGE difference, EDGESHIFT, in two bit cells called PREVP and PREVN. The current EDGESHIFT value and the stored PREVP and PREVN values are used to evaluate incremental changes to Tck.

Fast clock to data synchronization is provided at the beginning of each train of data pulses. Two device states are implemented according to the invention:

SO or the idle state, during which the REFCLK is stopped and the transmission line is watched for activity. A rough clock synchronization is achieved shortly after data transmission is sensed and the device switches to S1 or the active state The invention, including but not limited to a preferred embodiment thereof, will, however be more fully appreciated and comprehended by having refinance to the following detailed description taken in conjunction with the drawings and illustrations herein provided.

The preferred embodiment of the invention assumes Ns=LVLSR=8 but the number of attempted data samples during Twm can vary, depending on the performance level and/or cost required by a particular implementation. On the other hand as will be evident later, there is no practical reason for LVLSR to be greater than Ns+1.

Referring now to FIG. 1 of the drawings it is seen that the line signal on transmission line 8 is applied as an input to the low pass filter 1. The output 9 of the low pass filter 1, is then applied as an input to the line receiver 2. The received data RDATA on line 10 consists of width modulated pulses for which actual TW is not a multiple of TWm due to jitter. RDATA on line 10 is applied as a D input to the first cell DR0 of an 8 bit D type register 4. The register is clocked by the sample clock SAMPLECK on line 16. As mentioned above the sample period, from now on referred to as Ts conforms with TWm(expected) =8 Ts.

The length control logic 5 connects to the register 4 through data line 13 and links the data cells DR0..DR7 of 4 in a manner that will be described later and that makes 4 appear as a variable length shift register to the incoming RDATA on line 10. Register 4 outputs corrected data CDATA on line 11. CDATA is reformatted such that jitter is no greater than Ts. CDATA is sent to the conventional decoder 22. The data in Register 4 is monitored by the edge detector 3 through lines 12. The edge detector 3 provides information regarding the DEDGE position on lines 14. The edge position information on lines 14 is fed to the length control 5 to the status module 6 and to the REFCLK module 7.

The status module 6 can be in one of the two main states: SO or idle state and S1 or active state. The status information is outputed on line 17 and sent to the length control module 5 and variable frequency clock module 7. Two other status bits BITLOSO and BITLOSI are outputed on lines 18 and 19 respectively and aid the status module in correctly switching between the SO and S1 states. Two more status bits PREVN and PREVP on lines 20 and 21 respectively store DEDGE information which is used by the REFCLK module 7 The REFCLK module 7 is active only during S1. It takes the input SAMPLECK and divides it by a value of 7, 8, or 9 and outputs REFCLK0=1 for t=Ts at the beginning of each cycle.

The REFCLK logic monitors the EDGESHIFT, PREVP, and PREVN values and adjust the divisor to 7 when PREVN=1 and the EDGESHIFT value is negative. Likewise, it adjust the divisor to 9 when PREVP=1 and the EDGESHIFT is positive. For all other cases the divisor has the nominal value of 8.

Figures 2A, 2B:
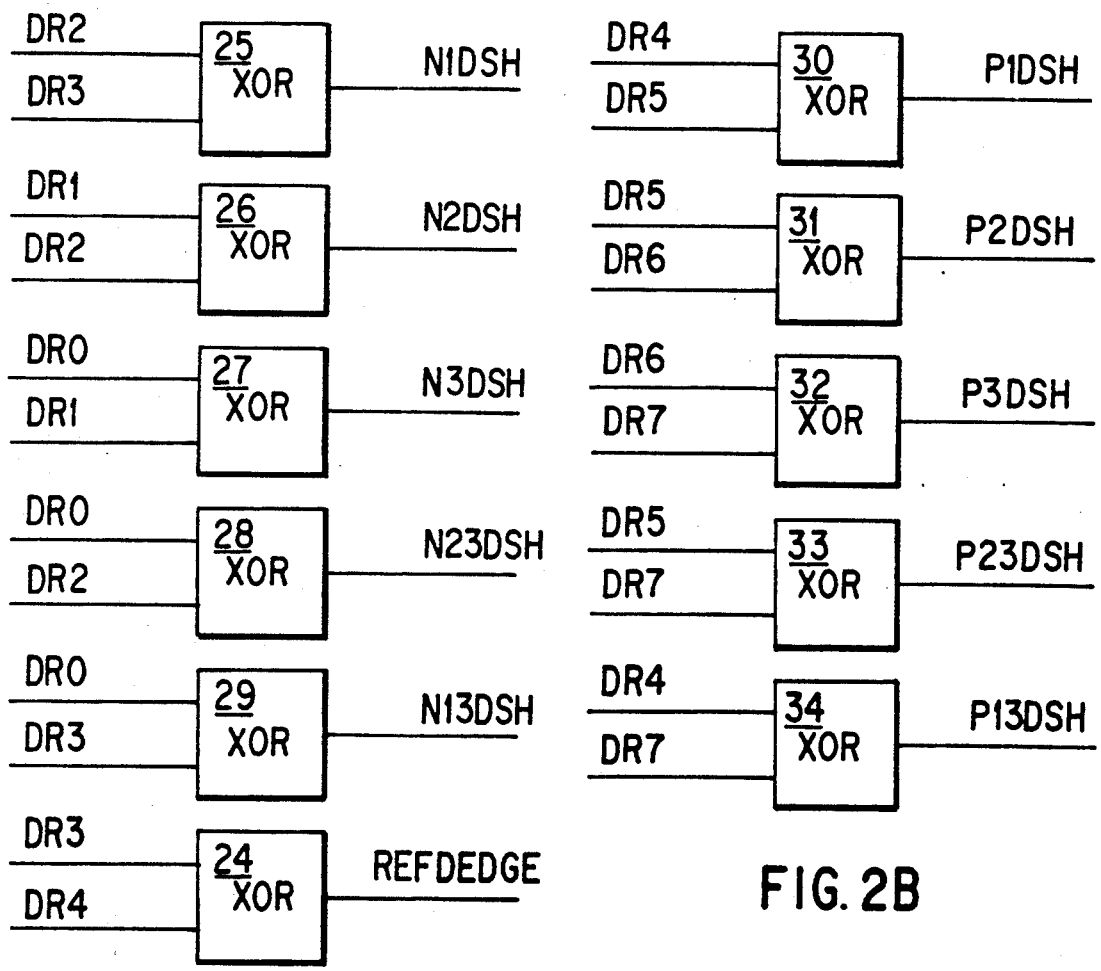
FIG. 2 illustrates a preferred detailed implementation of the edge detector of FIG. 1.
Figure 2C:
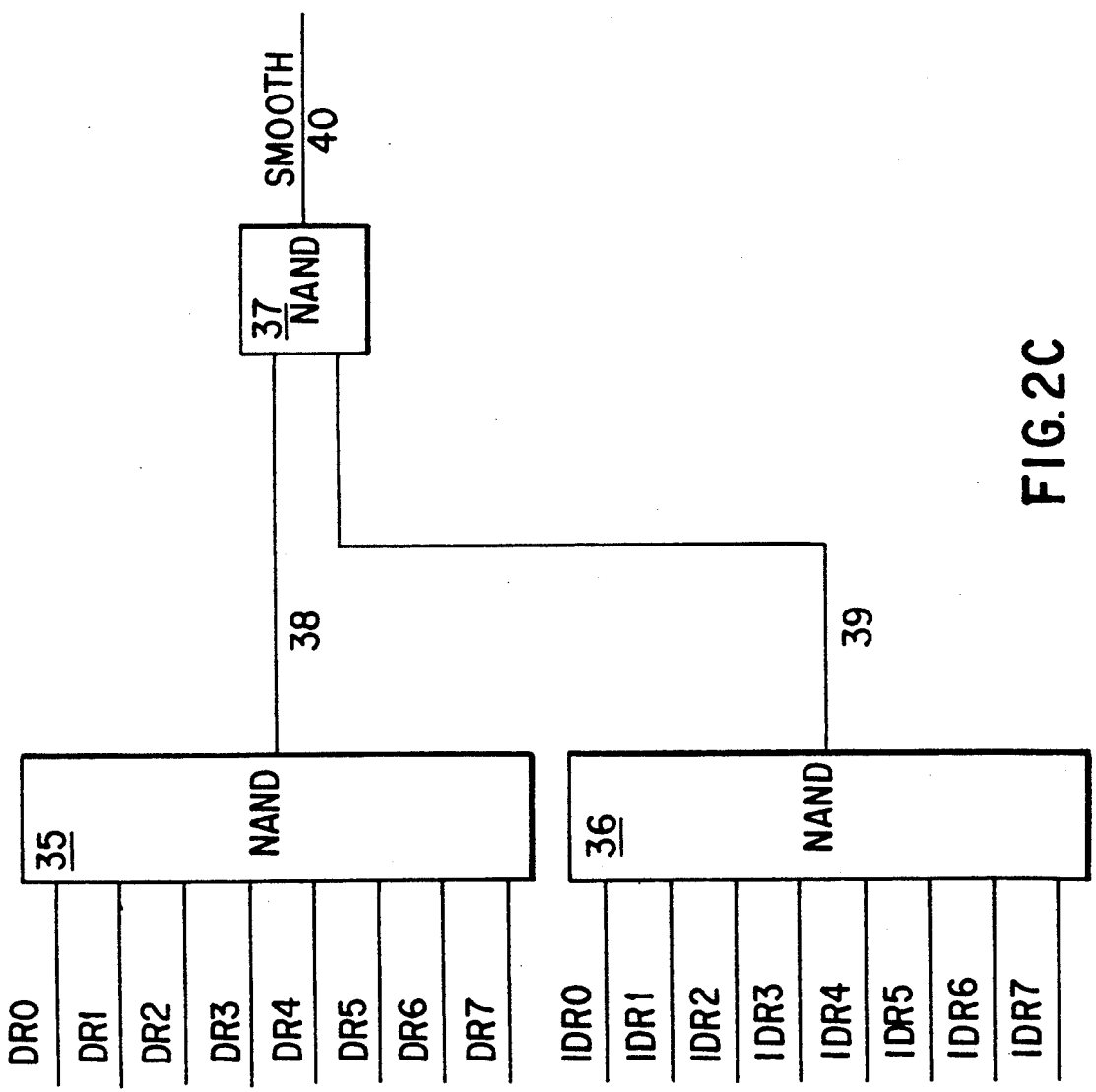

The edge detector module 3 is described in detail in FIG. 2. A number of 2 inputs exclusive-or (XOR) gates, marked 24 to 34 is used to generated data edge position information as follows:

| | | |
|---|---|---|
| REFDEDGE = 1 for EDGESHIFT = 0 | | gate 24 |
| N1DSH = 1 for EDGESHIFT = −1 | | gate 25 |
| N2DSH = 1 for EDGESHIFT = −2 | | gate 26 |
| N3DSH = 1 for EDGESHIFT = −3 | | gate 27 |
| P1DSH = 1 for EDGESHIFT = +1 | | gate 30 |
| P2DSH = 1 for EDGESHIFT = +2 | | gate 31 |
| P3DSH = 1 for EDGESHIFT = +3 | | gate 32 |
| N13DSH = 1 for EDGESHIFT = −1, −2, or −3 | | gate 29 |
| N23DSH = 1 for EDGESHIFT = −2, or −3 | | gate 28 |
| P13DSH = 1 for EDGESHIFT = +1,+2, or +3 | | gate 34 |
| P23DSH = 1 for EDGESHIFT = +2 or +3 | | gate 33 |

The NAND gates, 35, 36, and 37 generate the SMOOTH signal on line 40. SMOOTH=1 when all data bits in DR0...DR7 have the same value, meaning that no data edge is stored in DR.

Figure 3:
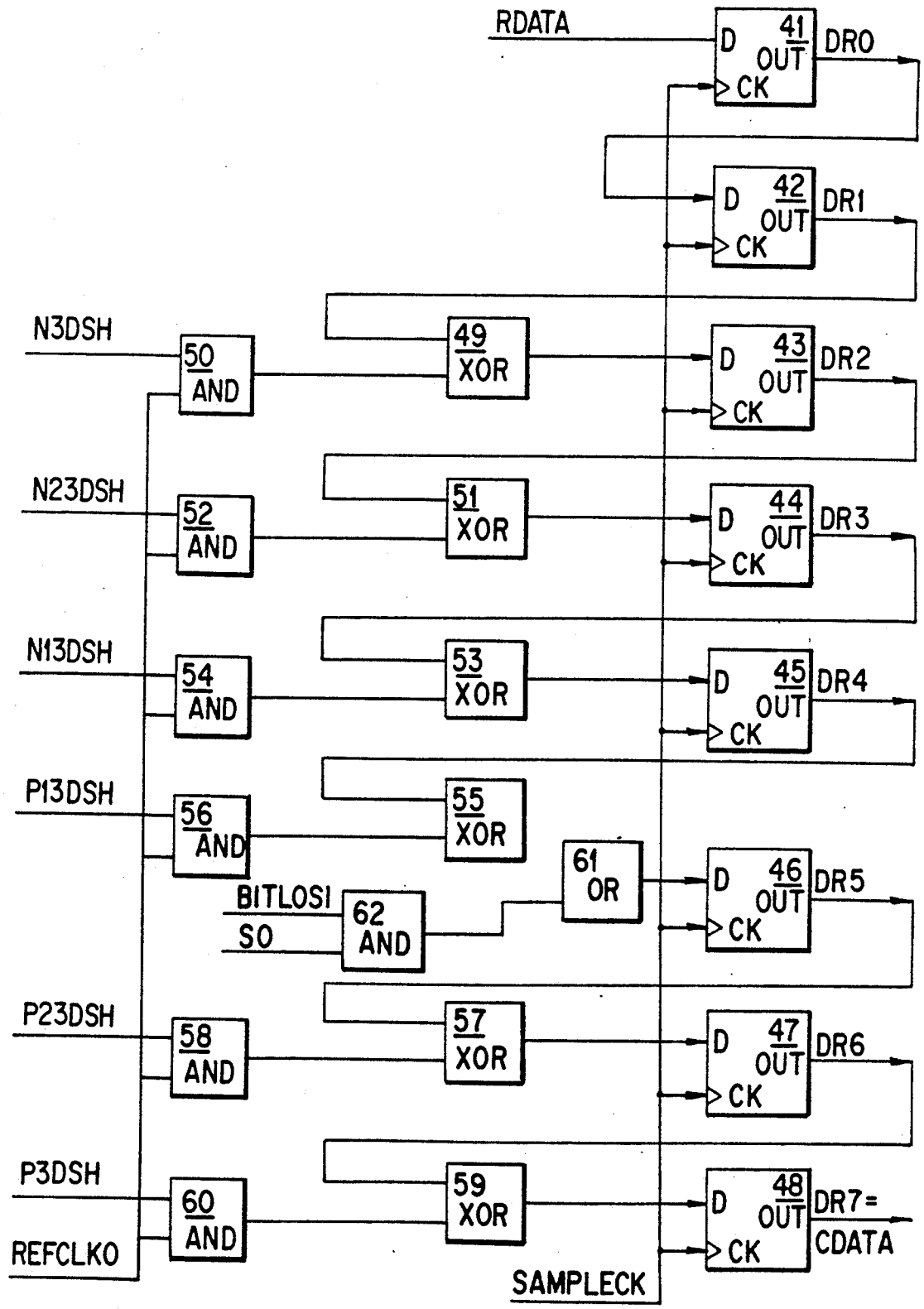
FIG. 3 illustrates a preferred detailed implementation of the VLSR.

Referring now to FIG. 3. it is seen that the 8 data cells are implemented with an 8 bit=D-type register. Bit cells are numbered 41..48 with corresponding outputs DR0...DR7. DRi outputs are passed to the i+1 data cell either directly or through exclusive OR (XOR) gates 49, 51, 53, 55, 57, and 59. When the other input to the XOR gate is "0", DRi is passed to the i+1 data cell inputs unchanged and the data register appear to be an 8 bit shift register. Whenever the other input to the XOR gate is "1", the corresponding DRi output is inverted before being passed to the i+1 data cell input. It is seen that the DRi polarity is controlled by the symmetrical signals:

DRI by N3DSH,
DR2 by N23DSH,
DR3 by N13DSH,
DR4 by N13DSH,
DR5 by N23DSH, and
DR6 by P3DSH Polarity control is activated only when REFCLK0=1 or, in other words when REFDEDGE is expected (or predicted by REFCLK). A few examples will further clarify how the data register and the length control module work.

In the first example it is assumed that while REFCLK0=1 data in DR3 and DR4 has opposite values. Then from FIG. 2:

REFDEDGE=1 and
N3DSH=N23DSH=P13DSH=P23DSH=P3DSH=0 it follows that

DRi+1 inputs=DRi for any I=0..7 and data passes through the shift register unchanged. VLSR length appears to be 8, as it should since the data edge and the REFCLK are synchronized The VLSR content immediately after REFCLK0 changes from "1" to "0" is:

11111000 or
00000111

A second example of the invention assumes that at REFCLK0=1 the VLSR content is:

11000000 or
00111111
meaning that:
N23DSH=N13DSH=1 and
N3DSH=P13DSH=P23DSH=P3DSH=0

At the end of REFCLK0 active, the DR content will change as follows:

11000000....11111000 or
00111111....00000111

It is seen that the data edge is now aligned with the reference clock as if the data register length was shrunk with two bit cells.

A third example assumes a positive data edge shift such that DR6 and DR7 have opposite polarities while REFCLK0=1 as follows:

11111110 or
00000001
meaning that:
N3DSH=N23DSH=N13DSH=0 and
P13DSH=P23DSH=P3DSH=1

At the end of REFCLK0 active, DR content becomes:
11111110....11111000 or
00000001....00000111

Again the data edge is aligned with respect to REFCLK0 as if three more data cells were added between DR6 and DR7.

It is also seen that while in idle state (SO active) and BITLOSI active DR5 is continuously loaded with "1". This effectively blocks the RDATA from passing through the register to the output CDATA. Its significance will be explained later. While in active state (SI active), the data register functions as described previously.

Figure 4:
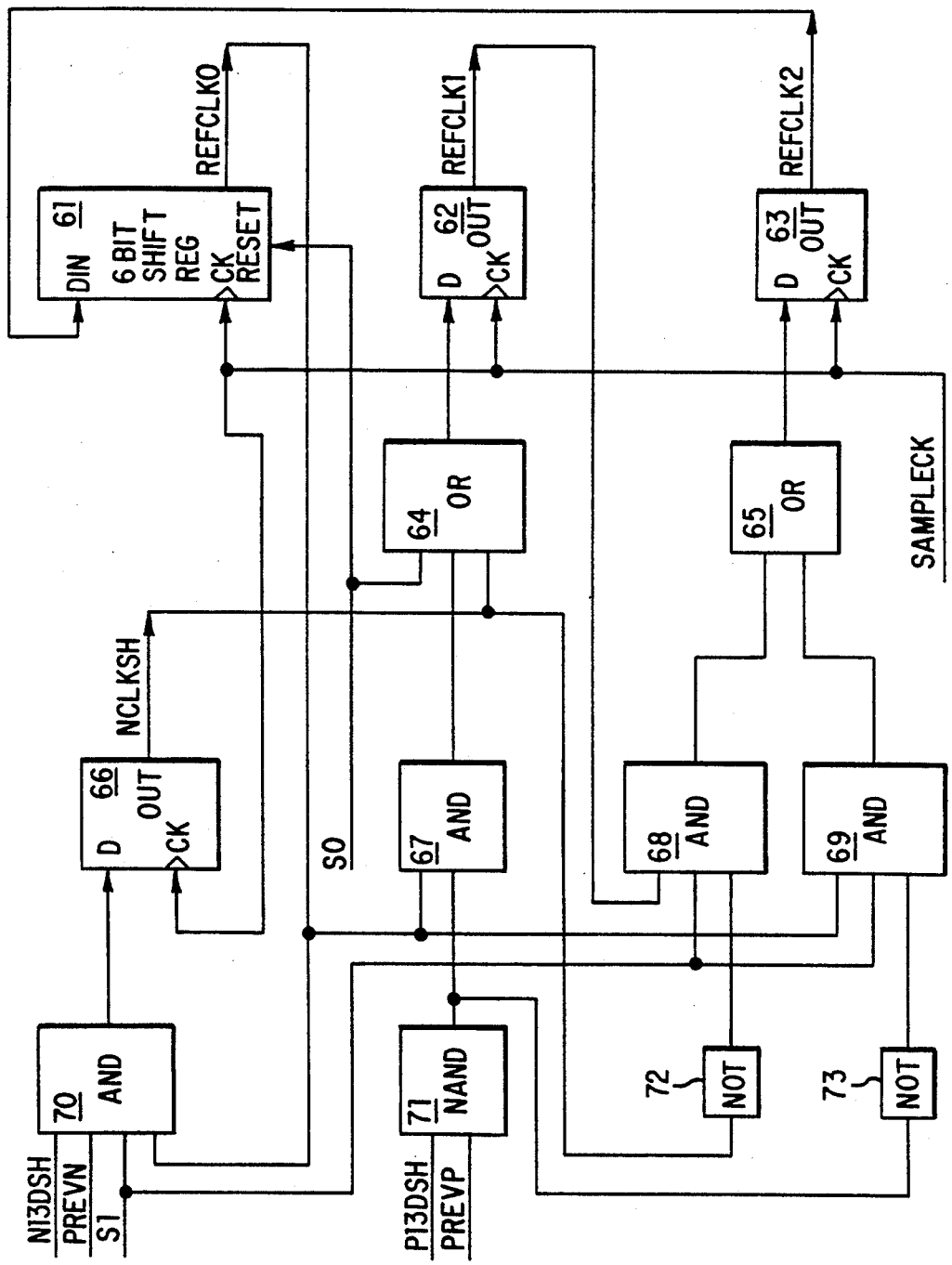
FIG. 4 illustrates a preferred detailed implementation of REFCLK.

FIG. 4 presents a detailed preferred embodiment of the variable frequency clock.

While the idle state SO is active the 6 bit shift register 61 is cleared. The OR gate 64 continuously loads S0=1 into register 62, forcing REFCLK1 to 1. The negated S0, namely S1 is false during the idle state, forcing 68 and 69, and gate outputs to zero, which is the value loaded into register 63, thus forcing REFCLK2=0. Similarly, NCLKSH is zero during S0.

As soon as the active state S1 becomes true (and idle state SO becomes false) the reset condition to 61 becomes false, and gate 67 and OR gate 64 pass the REFCLK0 value to REFCLK1, and gate 68 and OR gate 65 pass the REFCLK1 value to REFCLK2.

The combination 61, 62, 63 starts to function as an eight bit circular shift registor with one bit equal to one (REFCLK1) and seven bits equal to zero.

Whenever REFCLK0 becomes equal to 1, it marks the end of a sampling cycle and the beginning of another. Several things can happen while REFCLK0 is true:

P13DSH may be true and a previous positive data shift recorded (PREVP=1). Then the output of the NAND gate 71 becomes false and the AND gate 67 passes the value "zero" to REFCLK1 instead of the corresponding REFCLK0 value, which is "one". On the other hand, the NOT 73 gate output enables the AND gate 69 and that in turn passes the REFCLK0=1 value to REFCLK2. That, in effect, shortness the next sample cycle to 7Ts.

N13DSH may be true and a previous negative data shift recorded (PREVN=1). Then the output of the AND gate 70 becomes active and at the end of REFCLK0=1, NCLKSH becomes true. Also, the value REFCLK0=1 is passed to REFCLK1, such that NCLKSH=REFCLK1=1.

The next sample clock finds OR gate 64 output true and again loads REFCLK1-1. On the other hand, AND gate 68 is inhibited and REFCLK1 is not loaded into REFCLK2. The next REFCLK2 value is "0". Also, AND gate 70 output is false, and next NCKLSH value is "0". The shift register resumes normal operation. That, in effect lengthens the next sample cycle to 9 Ts.

None of the above conditions is met, then REFCLK0 value is passed to REFCLK1, and REFCIK1 value is passed to REFCLK2. The next sample cycle has the nominal 8 Ts length.

Figure 5:
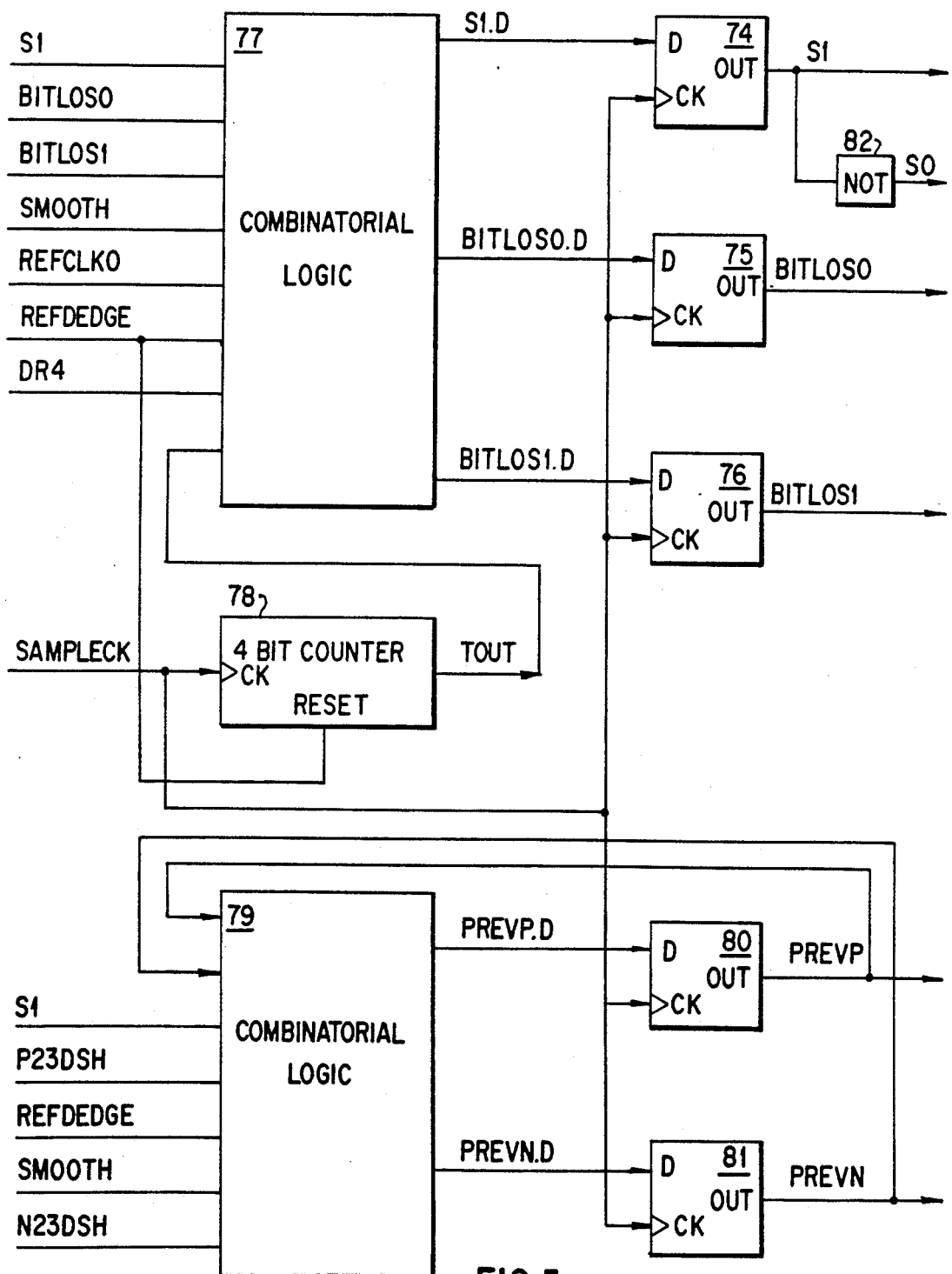
FIG. 5 is a block diagram of the status module of FIG. 1.

Referring now to FIG. 5, it is seen that S1, BITLOS0, and BITLOS1 are implemented as status bits of a sequential state machine. S1, BITLOS0 and BILOS1 are stored into D type registers 74, 75 and 76 respectively. The inputs to these registers, S1.D, BITLOS0.D and BITLOS1.D are generated by a combinatorial logic bloc, 77. The number of gates inside the combinatorial logic bloc 77 is relatively large and a detailed schematic does not easily explain its functions. Logic equations are more useful in this instance. They are as follows:

BITLOS0.D=(SMOOTH & !BITLOS0 & REFCLK0 #BITLOS0 & !REFCLK0) & S1 (BITLOS0 & !(!DR3 & DR4) #TOUT) & !S1;
BITLOS1.d=(SMOOTH & (BITLOS0 #BITLOS1) & REFCKL0 #BITLOS1 & !REFCLK0) & S1 #(BITLOS0 #BITLOS1 & !(!DR3 & DR4)
S1.D=!DR3 & DR4 & !BITLOS0 & BI/TLOS1 & !S1#S1 & !(BITLOS0 & BITLOS1); using the following shorthand for the corresponding BOOLEAN functions:

| ! | NOT | Also the .D suffix denotes the data input |
| & | AND | to a D type register. The clock input to |
| # | OR | the above registers is the sample clock |
| | XOR | SAMPLECK |

TOUT is a time out signal generated by a 4 bit counter 78. The 4 bit counter 78 is reset by any signal edge detected and counts any preset number of sample clocks, usually from 8 to 16 before it outputs the TOUT signal.

It is also seen that the PREVP and PREVN are generated in a similar manner by the combinatorial logic bloc 79, and registers 80 and 81.

PREVP.D=(P23DSH & !PREVP #(REFDEDGE#SMOOTH) & PREVP) & REFCLK0 & S1 #PREVP & !REFCLK0 & S1;

PREVN.D=(N23DSH & !PREVN #(REFDEDGE #SMOOTH) & PREVN) & REFCLKO & S1#PREVN $ !REFCLKO & S1;

Signals PREVP and PREVN are set and reset as explained below: EDGESHIFT=DEDGE-REFDEDGE (number of bit cells that separate DEDGE and REFDEDGE)

If EDGESHIFT>1 then
　A bit cell called PREVN is set to 0
　A bit cell called PREVP is toggled such that its value changes from 0 to 1 or from 1 to 0
If EDGESHIFT<1 then
　PREVP is set to 0
　PREVN is toggled such that its value changes from 0 to 1 or from 1 to 0
If EDGESHIFT=+1 or
　EDGESHIFT=-1 then
　Both PREVP and PREVN are reset to 0
If EDGESHIFT=0 or
　SMOOTH=1 then
　Both PREVP and PREVN values are preserved The invention thus also provides a means for recognizing that circuit nonlinearity shifts DEDGE in one direction for high to low transitions and in the opposite direction for low to high transitions of the line signal on transmission line 8. The device according to the invention always attempts to locate REFCLKO such that the DEDGE has opposite values for opposite transitions, as will be explained later.

FIG. 6 illustrates a typical transition from idle state S0 to active state S1. It is assumed that a high to low data transition SDEDGE is used to synchronize the receiver clock and that the high to low transition at "To" is the first such transition of the incoming signal.

It is also assumed that the synchronizing frequency is the maximum frequency used by the encoding technique, i.e. Tck=8 Ts.

The above assumptions are only made for presentation purposes. It should be noted that the principles of operation are preserved while assumed conditions change. While no signal is present, the status module outputs S1=0 and BITLOS0=BITLOS1 =1. At To, REFDEDGE as well as SDEDGE become high and on the next sample clock BITLOS0 becomes low. This state is preserved until T1 when again REFDEDGE and SDEDGE=1. On the next sample clock BITLOS1 becomes low and the transfer of data from DR4 to DR5 of the data register is activated. From now on, the incoming signal passes through the data register to the CDATA output. However, incoming data up to T1, which is most affected by the transition from line inactive to line active is rejected. At T2, when REFDEDGE=SDEDGE=1 conditions are met for the transition to S1, the active state. After S1 becomes high the reference clock register is activated. REFCLK1 is no longer set to "1" and data is passed along the circular shift register. The next data edge at T3 is the first to be adjusted, if necessary with respect to REFCLKO. It can be seen that while still in idle state S0, if data edges are not sensed in time, TOUT becomes "1" and BITLOS0 and BITLOS1 are preset to "1" and the entire sequence has to start again from the beginning. Use of TOUT to preset BITLOS0, and BITLOS1 is helpful for rejecting unwanted signals like for instance, reflections at the end of strong transmission signals (that can be generated by the transmitter associated with the receiver).

Figures 7A, 7B, 7C, 7D, 7E, 7F:
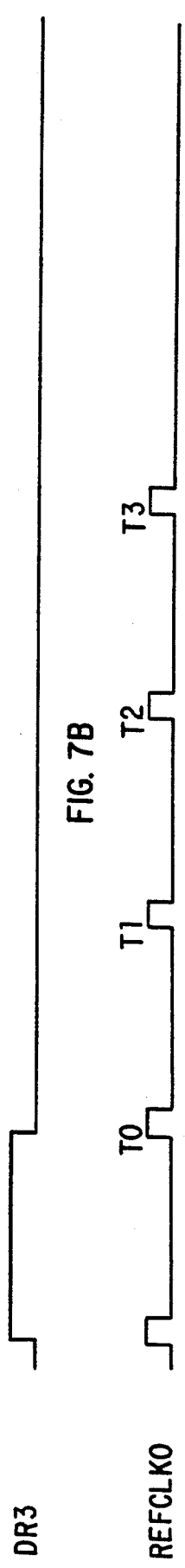
FIG. 7 is a waveform diagram illustrating the transition from S1 to S0.

By contrast, FIG. 7 illustrates a typical transition from the active state S1 to the idle state S0. At "To" the incoming signal ends. From then on, whenever REFCLKO=1 the SMOOTH signal is true, SMOOTH=1. That in turn makes BITLOS0 and BITLOS1 function as counters of the REFCLKO signal. As such, they change to BITLOS0=1, BITLOS1=1 at T3, the third REFCKL0 after signal ended. One sample clock later S1 becomes false and S0 true.

Any data transition that occurs at either T1, T2, or T3, resets BITLOS0=BITLOS1=0 and state S1 is preserved. It is to be noted that for SMOOTH to hold true, it is necessary that at any sampling time Ti, data has the same value for at least four (4) sample clocks on each side of "Ti".

Referring now to FIG. 8, it is seen how the reference clock synchronizes with incoming jittery data. FIG. 8 can be viewed as a continuation of FIG. 6, where T2 marks the transition from idle state S0 to active state S1. It is to be noted that for clarity data in DR3 is presented as if no data register length adjustment were made. It is assumed that jitter=2 Ts.

The first REFCLKO active, at T3 finds N2DSH, N23DSH and N13DSH true, and thus, the next sample clock sets PREVP=1. At T4, no jitter is detected, but PREVP value is preserved.

At T5, again N2DSH, N23DSH and N1DSH are found to be true and, as a result, as was previously presented, REFCLK1 is bypassed and the next sample cycle is shortened to 7 Ts. PREVP is also reset to zero.

At T6, the REFCLKO is already synchronized with the incoming data. Now one data edge is shifted one sample clock to the right of REFCLKO (T6), the other data edge is shifted one sample clock to the left of REFCLKO (T7). This is a stable state. Neither PREVP, nor PREVN are set and the reference clock is not changed. It is easy to see that if jitter=3 Ts, the reference clock will be adjusted so that one data edge is shifted two sample clock with respect to REFCLKO, while the other edge is shifted one sample clock in the opposite direction with respect to the same REFCLK0. Also, when jitter=1, the REFCLK0 will follow one data edge.

FIG. 9a illustrates how noise rejection works. It is assumed that the incoming signal has a jitter of 2 Ts and that noise shifts data edges at T2 and T3 with 3 Ts to the right and 2 Ts to the left respectively. It is easily seen that data can still be corrected, although the distorted data pulse (data low) has a width of only 3 Ts. PREVN is set at T2 but is reset at T3 with no changes to the reference clock.

Similarly, FIG. 9b illustrates how noise can affect data width in the opposite direction. Here data is high for 14 Ts or 2 Tck-2 Ts and still can be corrected.

FIG. 9a and 9b indeed present extreme situations. However, certain encoding techniques embed markers into the data stream that can represent frequency variations of more than 3:1. In such instances the data will be affected by jitter of greater magnitude than the average frequency variation of 2:1, will produce with resulting data pulse widths as shown in FIG. 9.

What is claimed is:

1. A device for detecting and correcting signal distortion in a received digital signal comprising a series of signal pulses whose parameters are defined by transitions in the amplitude of said signal pulses, which device comprises
   A. Means for sampling said signal pulses a predetermined number of times;
   B. Variable length shift register means for selectively storing and retrieving said predetermined number of signal pulse values comprising
      1. A variable number of memory cells for selectively receiving and storing said pulse values;
      2. Means to selectively pass said signal pulse values sequentially through said memory cells;
      3. Means for selectively varying the number of said memory cells receiving said signal pulse values to thereby correct distortion in said received signal caused by aberrations in the position of signal pulse transitions.
   C. Means for generating a variable frequency reference clock;
   D. Means for synchronizing said reference cock with said sampled signal pulse values such that the position of transitions defining said signal pulses is predicted to occur at the middle of said shift register means.

2. A device for detecting and correcting signal distortion in a received digital signal comprising a series of signal pulses whose parameters are defined by transitions in the amplitude of said signal pulses, which device comprises
   A. Means for sampling said signal pulses a predetermined number of times;
   B. Variable length shift register means for selectively storing and retrieving said predetermined number of signal pulse values comprising
      1. A plurality of memory cells for selectively receiving and storing said pulse values;
      2. Means to selectively pass said signal pulse values sequentially through said memory cells;
      3. Means for selectively varying the number of said memory cells receiving said signal pulse values, said means for varying the number of memory cells being responsive to the input of stored data from means for monitoring the actual and predicted position of transitions in the amplitude of received signal pulses;
   C. Means for generating a variable frequency reference clock;
      1. Means for counting a predetermined number of sample cycles of said signal pulses:
      2. Pulse transition indicator Means for indicating that said predetermined number of counted sample cycles has occurred and that a signal pulse transition is predicted to occur at a particular position on said shift register;
      3. Means for varying said number sample cycles being counted;
   D. Means for synchronizing said reference clock with said sampled signal pulse values such that the position of transitions defining said signal pulses is predicted to occur at the middle of said shift register means, said reference clock synchronizing means comprising
      1. Means for stopping said reference clock when said signal transitions are not detected for a predetermined number of sample cycles;
      2. Means for activating said pulse transition indicator and starting said reference clock when a predetermined signal transition occurs a predetermined number of times inside a predetermined number of said sample cycles;
      3. Means for indicating signal transitions when the actual position of said signal transition occurs at least two sample cycles before or after said reference clock prediction indicator signal;
      4. Means for storing said indicator signals when no signal transitions occur or when said signal transitions occur at predicted times;
      5. Means for clearing said storing means for said indicator signals whenever an actual signal transition is not a predicted transition;
      6. Means for indicating to said reference clock means to decrease the number of counted sample cycles when an actual transition occurs earlier than predicted;
      7. Means for indicating to said reference clock means to increase said number of counted sample cycles when an actual transition occurs later than predicted.

3. A device for detecting and correcting signal distortion in a received digital signal comprising a series of signal pulses whose parameters are defined by transitions in the amplitude of said signal pulses, which device comprises
   Means for sampling said signal pulse values a predetermined number of times;
   B. Variable length shift register means for selectively storing a retrieving said predetermined number of signal pulse values comprising
      1. A plurality of memory cells for selectively receiving and storing said pulse values;
      2. Means to selectively pass said signal pulse values sequentially through said memory cells;
      3. Means for selectively varying the number of said memory cells receiving said signal pulse values in order to conform the position of the actual received transition defining said signal pulse with a predicted position to said transition to thereby correct distortion in said received signal caused by aberrations in the position of signal pulse transitions, said means for varying the number of memory cells being responsive to the input of stored data from means for monitoring the actual and predicted position of transitions in the amplitude of received signal pulses;
   C. Means for generating a variable frequency reference clock, said means comprising
      1. Means for counting a predetermined number of sample cycles of said signal pulses;
      2. Signal pulse transition indicator Means for indicating that said predetermined number of counted sample cycles has occurred and that a signal pulse transition is predicted to occur at a particular position on said shift register;
      3. Means for varying said number sample cycles being counted;
   D. Means for synchronizing said reference clock with said sampled signal pulse values such that the position of transitions defining said signal pulses is predicted to occur at the middle of said shift register means said means comprising
      1. Means for stopping said reference clock when said signal transitions are not detected for a predetermined number of sample cycles;

2. Means for starting said reference clock when a predetermined signal transition occurs a predetermined number of times inside a predetermined number of said sample cycles such that said predicted signal pulse transition indicator means is activated when said signal transition occurs at the middle of said shift register means;
3. Means for indicating an earlier or late signal transition when the actual position of said signal transition occurs at least two sample cycles before or after said reference clock prediction indicator signal;
4. Means for storing said indicator signals when no signal transitions occur or when said signal transitions occur at predicted time, provided said storing means were cleared previous to said early and late signal transition detection;
5. Means for clearing said storing means for said indicator signals whenever an actual signal transition is not a predicted transition;
6. Means for indicated to said reference clock means to decrease the number of counted sample cycles when an actual transition occurs earlier than predicted and the said early indicator storing means is cleared;
7. Means for indicating to said reference clock means to increase said number of counted sample cycles when an actual transition occurs later than predicted and the said late indicator storing means is cleared.

* * * * *